No. 650,907. Patented June 5, 1900.
H. POPE.
BICYCLE TIRE.
(Application filed Nov. 11, 1899.)
(No Model.)
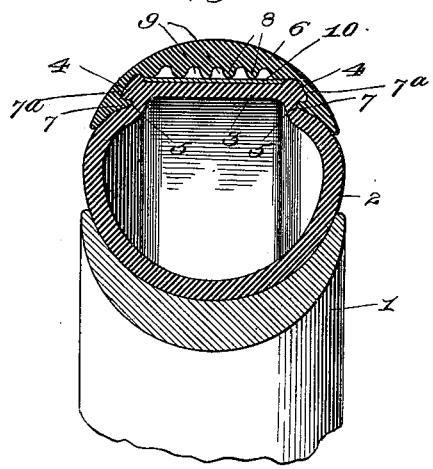
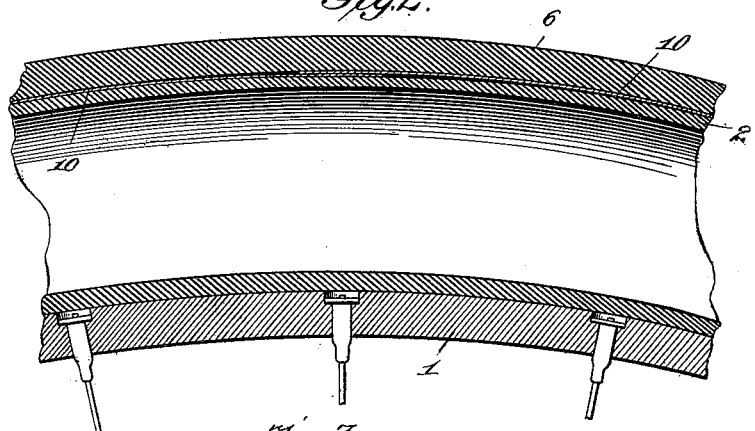
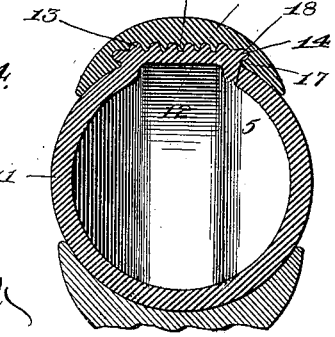
Inventor
H. Pope,
Attorneys
THE NORRIS PETERS CO., PHOTO-LITHO., WASHINGTON, D. C.

UNITED STATES PATENT OFFICE.

HOWARD POPE, OF HOLLIDAYSBURG, PENNSYLVANIA, ASSIGNOR OF ONE-HALF TO JOHN S. DUNN, OF DUNCANSVILLE, PENNSYLVANIA.

BICYCLE-TIRE.

SPECIFICATION forming part of Letters Patent No. 650,907, dated June 5, 1900.

Application filed November 11, 1899. Serial No. 736,663. (No model.)

*To all whom it may concern:*

Be it known that I, HOWARD POPE, a citizen of the United States, residing at Hollidaysburg, in the county of Blair and State of Pennsylvania, have invented a new and useful Improvement in Bicycle-Tires, of which the following is a specification.

This invention relates to bicycle or other pneumatic tires generally, but more especially to the tread thereof; and it consists of a separate tread secured to the main tire detachably or otherwise, the object of which is to protect the pneumatic tire from punctures, &c.; and with this and minor objects my invention consists of the parts and combination of parts, as will be more fully hereinafter pointed out.

In the drawings forming a part of this specification, Figure 1 is a cross-section of a tire constructed according to my invention. Fig. 2 is a central vertical section of the same. Fig. 3 is a detail perspective view of the steel armor used in this tire. Fig. 4 is a cross-section of a modified form, and Fig. 5 is a similar view of another modified construction.

1 represents the rim of a wheel, suitably formed to receive a pneumatic tire.

2 is the pneumatic tire, secured in the usual manner to the rim 1 and provided with a flat tread 3, on each side of which is formed a rib or flange 4.

5 is a groove formed in the tire, between the main body thereof and the flat tread 3, as clearly shown in Fig. 1. The portions of the tube between its sides and the edges of the flat tread are contracted or more abruptly curved inward than the remaining portions.

6 is the supplemental tread, adapted to fit the tread of the tire and extend a suitable distance up the sides of said tire, the edges of which are provided with a lug or flange 7, adapted to be secured in the groove 5 on each side of the tire 2.

7ª is a groove formed in the inner face of the tread 6, adapted to snugly fit over the flange or rib 4.

The edges of the supplemental tread or the portions beyond the flanges 7 gradually taper in cross-section, so as to fit upon the abruptly-curved portions of the tube, and thereby fill out the same, so as to produce a tire of substantially a true circle in cross-section, thereby producing a neater-appearing tire than where the supplemental tread is placed exteriorly of a tire having a true circle in cross-section.

8 are corrugations or ribs formed on the center of the inner face of the supplemental tread, forming air-spaces.

10 is a flat steel armor secured around the tire on the flat tread 3, the ends thereof overlapping, as shown in Fig. 2, the corrugations 8 resting on the said steel armor when the parts are assembled as seen in Fig. 1.

In Fig. 4 I have shown a modified form of my invention, wherein 11 is the tire, having a flat tread 12, upon which are formed ribs or corrugations 13. 14 is a rib extending laterally from each side of the said flat tread, forming grooves 15. 16 is a supplemental tread extending a suitable distance around the tire, the edges of which are provided with ribs 17 and grooves 18, which are adapted, respectively, to engage and interlock with the ribs 18 and grooves 15, thereby firmly securing the supplemental tread to the tire. 19 are ribs or corrugations formed on the inner face of the supplemental tread, adapted to interlock with the ribs or corrugations 13 on the flat tread of the tire 11. Said ribs by reason of their interlocking prevent the supplemental tread from slipping sidewise on the main tire, as will be readily understood.

In Fig. 5 I have illustrated another modified form of supplemental tread, which comprises an endless band 20, crescent shape in cross-section and secured upon the main tire by means of cement. From the construction of this form it will be readily understood that it may be firmly held in place upon the tire by simply inflating said tire.

From the above it will readily be seen that either of the supplemental treads may be secured to the tire firmly by simply inflating the tire and that they will not slip sidewise; but of course it will be understood that I may, if found desirable, secure the supplemental tread to the tire by cementing the inner faces of the same.

This invention provides a cheap, simple, yet effective armor for pneumatic tires against punctures, thus materially reducing the expense of keeping a bicycle or other vehicle having pneumatic tires. Should the supplemental tread become materially damaged or worn out, a new one can be substituted very quickly and at a minimum expense and without loss of the use of the vehicle on which it is used. Should a tack, nail, or piece of glass penetrate the supplemental tread, it cannot injure or puncture the tire, as the steel armor will stop it and turn it to one side.

Having thus fully described my invention, what I claim as new, and desire to secure by Letters Patent, is—

In a bicycle-tire the combination with a pneumatic tube provided with a flat tread and a grooved flange upon each side thereof, the portions of the tube between the sides and the grooves of the flanges being contracted or abruptly curved inward, of a flat steel armor around the tube on the flat tread, and a supplemental tread, the central portion of the interior of which is corrugated longitudinally and rests upon the metallic band and is provided with flanges to fit in the grooves of the flanges of the tube, and the edges are reduced in thickness and rest against the abruptly-curved portion of the tube, whereby the tube and the supplemental tread form a tire of substantially a true circle in cross-section.

HOWARD POPE.

Witnesses:
J. T. LEET,
GEORGE M. BUOYMAST.